US012780697B2

(12) United States Patent
Barton et al.

(10) Patent No.: US 12,780,697 B2
(45) Date of Patent: Nov. 3, 2026

(54) INLINE DISPENSER SYSTEM

(71) Applicant: King Technology Inc., Minnetonka, MN (US)

(72) Inventors: Eric Barton, Eden Prairie, MN (US); Jeffrey D Johnson, Edina, MN (US); Darrin M Swagel, Minnetonka, MN (US)

(73) Assignee: King Technology, Inc., Minnetonka, MN (US)

( * ) Notice: Subject to any disclaimer, the term of this patent is extended or adjusted under 35 U.S.C. 154(b) by 1000 days.

(21) Appl. No.: 17/941,479

(22) Filed: Sep. 9, 2022

(65) Prior Publication Data

US 2023/0085032 A1 Mar. 16, 2023

Related U.S. Application Data

(60) Provisional application No. 63/360,216, filed on Sep. 14, 2021.

(51) Int. Cl.
*C02F 1/68* (2023.01)
*C02F 103/42* (2006.01)

(52) U.S. Cl.
CPC .......... *C02F 1/685* (2013.01); *C02F 2103/42* (2013.01); *C02F 2201/006* (2013.01)

(58) Field of Classification Search
CPC .. C02F 1/685; C02F 1/68; C02F 1/688; C02F 2103/42; C02F 2201/006; C02F 2201/004; B01D 29/13; B01D 29/54; B01D 29/35; B01D 2201/24; B01D 2201/4038; B01D 2201/4053; E04H 4/1281; B01F 21/20; B01F 21/22; B01F 21/501; B01F 21/221
USPC ........................................ 210/198.1
See application file for complete search history.

(56) References Cited

U.S. PATENT DOCUMENTS

| | | | | |
|---|---|---|---|---|
| 3,369,691 | A | 2/1968 | Tohchung | |
| 3,771,968 | A | 11/1973 | Stalnaker | |
| 3,837,574 | A | 9/1974 | Curran | |
| 7,052,615 | B2 | 5/2006 | King et al. | |
| 7,060,190 | B2 | 6/2006 | King et al. | |
| 7,883,623 | B2 | 2/2011 | King et al. | |
| 9,452,393 | B2 | 9/2016 | King et al. | |
| 10,612,258 | B2 | 4/2020 | Coelho et al. | |
| 2004/0108261 | A1* | 6/2004 | King | E04H 4/1281 210/198.1 |
| 2004/0168963 | A1* | 9/2004 | King | B01F 21/22 210/198.1 |
| 2014/0158713 | A1* | 6/2014 | King | C02F 1/688 29/401.1 |

(Continued)

FOREIGN PATENT DOCUMENTS

| | | | |
|---|---|---|---|
| DE | 202008007246 | U1 | 11/2008 |
| WO | 2018184546 | A1 | 10/2018 |

OTHER PUBLICATIONS

European Patent Office, "Extended European Search Report", From Application No. 22870534.9, Dated May 20, 2025, pp. 8.

*Primary Examiner* — Akash K Varma
(74) *Attorney, Agent, or Firm* — Fredrikson & Byron, P.A.

(57) ABSTRACT

A dispensing system comprising a housing supporting a first cartridge and a second dispensing cartridge where the first cartridge is positionable in a first compartment of the housing but not in a second compartment of the housing to prevent a change in an axial position of the first cartridge and the second dispensing when a cartridge is replaced in the housing.

12 Claims, 5 Drawing Sheets

(56) References Cited

U.S. PATENT DOCUMENTS

2021/0172188 A1 * 6/2021 Afshar .................. E04H 4/1281

* cited by examiner

INLINE DISPENSER SYSTEM

CROSS REFERENCE TO RELATED APPLICATIONS

This application claims priority from provisional application 63/360,216 filed Sep. 14, 2021.

STATEMENT REGARDING FEDERALLY SPONSORED RESEARCH OR DEVELOPMENT

None

REFERENCE TO A MICROFICHE APPENDIX

None

BACKGROUND OF THE INVENTION

The concept of a cartridge carrier for holding two cartridges in an end-to-end condition so that the two dispensers can be simultaneously inserted or removed from a water circulation and water purification system is shown in King et al. U.S. Pat. Nos. 7,883,623, 7,507,331 and 7,052,615. King et al discloses a skeleton housing axially placeable in a hot tub circulation system where water flows through the skeleton housing and in and out of the cartridges therein. The skeleton housing also provides a convenient tool for holding the cartridges in a dispensing position within the skeleton housing as well as for removing spent cartridges from within the skeleton housing. King et.al shows a top partial circumferential edge, which extends radially inward to engage a top end of a first cartridge dispenser and a second identical partial circumferential edge that also extends radially inward to engage a top end of a second cartridge dispenser.

The flexible edges on the skeleton housing, which flex radially outward, can be configured to provide a slight frictional fit between an outer surface of the cartridge and the inner surface of the skeleton housing thereby holding a cartridge in a dispensing position as well as permitting insertion and removal of the cartridge from the skeleton housing. An advantage of the skeleton housing is that it prevents movement of the cartridges in the housing due to changing water conditions, which could cause unwanted noise.

While the King et al. patents disclose a skeleton housing that holds the cartridges in an end-to-end condition within the skeleton housing the direction of water flow through and along the skeleton housing as well as the upstream or downstream positioning of the cartridges within, the skeleton housing may affect a concentration of the dispersants delivered into the hot tub as well as the life of a cartridge dispenser.

The invention described herein eliminates operator error due to incorrect axial placement of cartridges in a cartridge carrier though use of unique locaters such as keys and keyways that prevent an operator from incorrectly inserting a cartridge into an incorrect axial position in a cartridge carrier.

SUMMARY OF THE INVENTION

The invention comprises an inline cartridge carrier for carrying and cradling a first cartridge and a second cartridge in an end-to-end condition within the inline cartridge carrier with the inline cartridge carrier having at least one keyway or key for mateingly engaging a first cartridge so there is only one axial position for the first cartridge dispenser within the cartridge carrier. While the first cartridge dispenser and the second cartridge dispenser are both cradled in an end-to-end position within the cartridge carrier, the key on the first cartridge dispenser is keyable into a keyway in the cartridge carrier to cradle the first cartridge dispenser into only one axial position in the cartridge carrier. If desired, the second cartridge dispenser may be keyable into a second keyway in the cartridge carrier to cradle the second dispenser therein with the first key and the second key different from each other to prevent insertion of the first cartridge into the cradle for the second cartridge and insertion of the second cartridge into a cradle for the first cartridge. In another mode the invention can be used to ensure that a hot tub manufacturer or supplier can assist a hot tub owner in the proper maintenance of his or her hot tub.

DESCRIPTION OF THE PREFERRED EMBODIMENT

Figure 1:
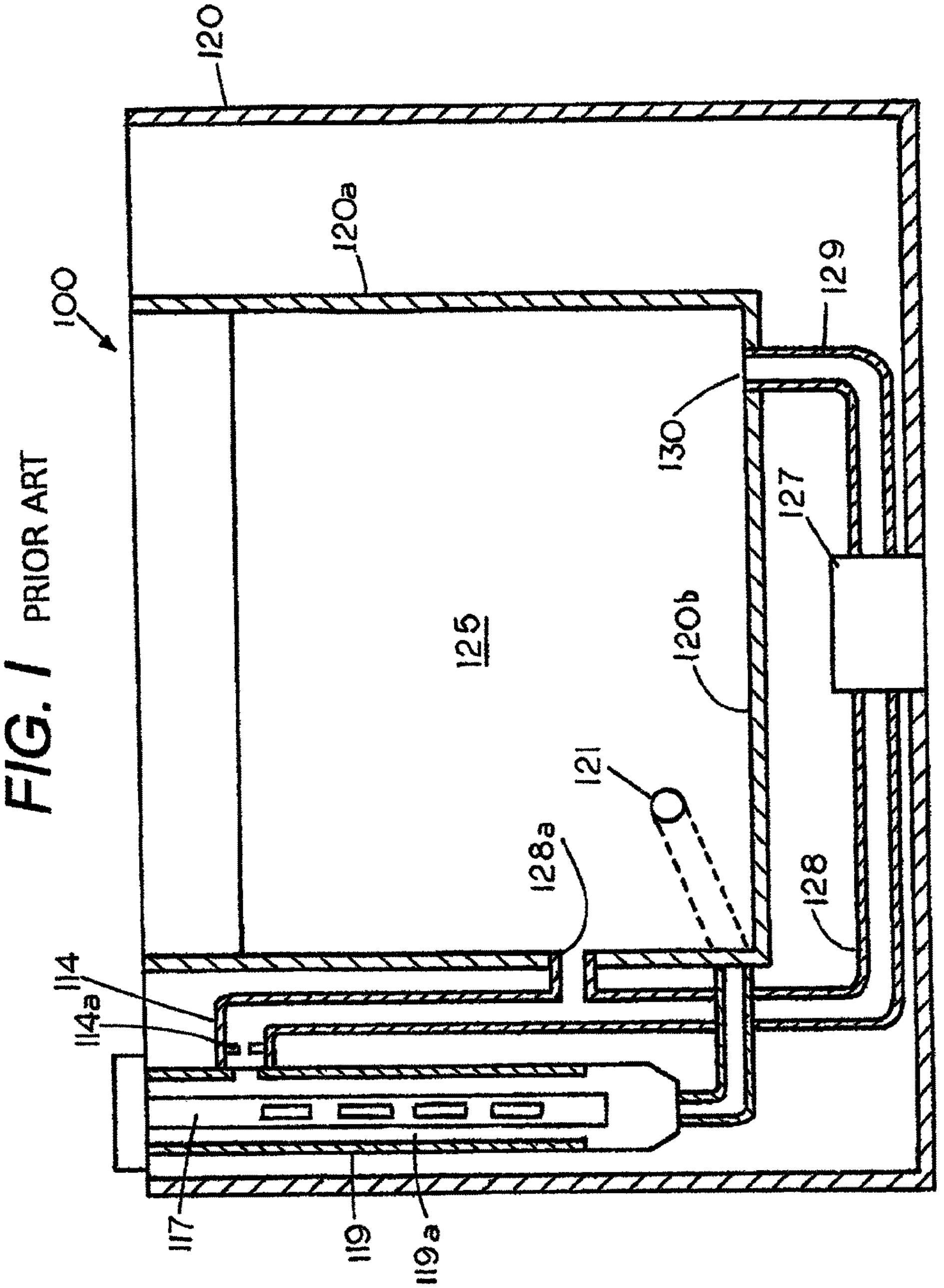
FIG. 1 PRIOR ART
FIG. 1 is a cutaway view of a hot tub system having a container and an inline dispenser for dispensing materials into the fluid in the container.

FIG. 1 is a cutaway view showing a prior art dispensing system 100 with an outer housing 120 having an inner container 120*a*, which is partially filled with a fluid, such as water 125. Typically, system 100 can be used in a pool, hot tub or other fluid containers where a fluid treatment is required. For example, the system can be used for treating water that is used either for work, pleasure or for drinking.

In the embodiment shown container 120*a* is configured in a hot tub mode with a seating area 120*b*, an inlet 130 positioned to draw water into an inlet pipe 129 through a pump 127. Pump 127 increases the pressure of the water and forces the water through fluid conduit 128 on the outlet side of the pump 127 where a portion of the water discharges through underwater port 128*a* as a high-pressure fluid jet. The high-pressure fluid jet provides multiple functions, for example, in a hot tub, the high-pressure fluid jet produced by the pump 127 circulates the water 125 in the hot tub thus ensuring that water purification materials in the hot tub are dispersed throughout the hot tub. In addition, the high-pressure jet can also provide a water massage to a user sitting in the hot tub.

The downstream velocity of the high-pressure jet that enters dispensing housing 119 is decreased through an orifice or restriction 114*a*, which reduces the velocity of the water flowing through a dispersant in a well or a chamber 119*a*. As water flows through a dispensing system 117 in chamber 119*a* the dispersants are carried into the main body of water 125 through a port 121.

Typically, the fluid restriction 114*a* is in the form of a small aperture with a cross sectional flow diameter typically on the order of 0.010 of an inch while the cross-sectional flow diameter of fluid conduit 128 and underwater port 128*a* may be two inches or more.

Figures 2, 2A:
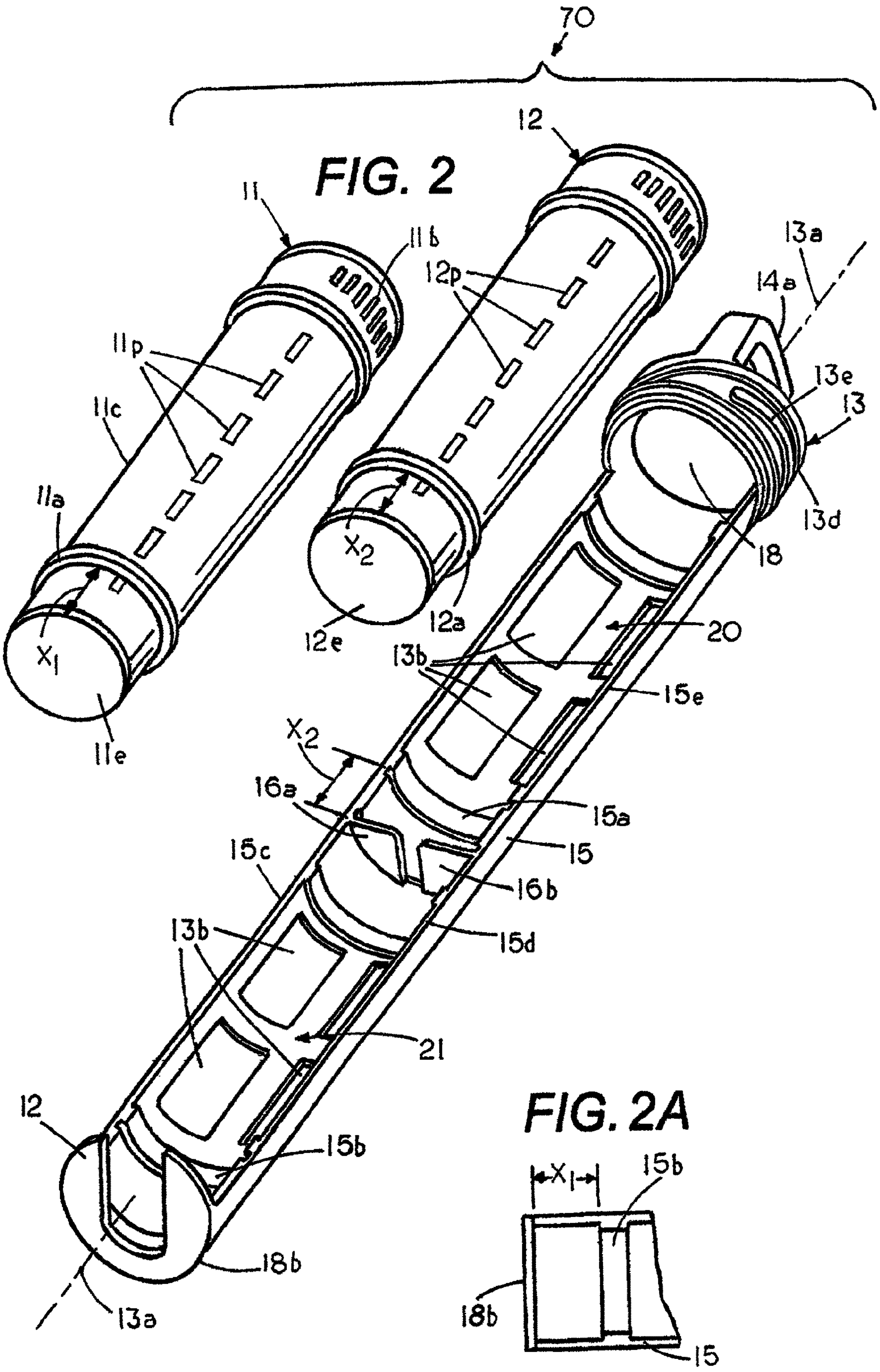
FIG. 2 is an exploded view of a cartridge carrier and mating cartridges.
FIG. 2A is an isolated to view of the end of the cartridge housing.

FIG. 2 is an exploded view of the dispensing system 70 of the present invention that prevents improper placement of two or more dispensing cartridges in an inline cartridge carrier 13. While dispensing rates from two or more cartridges located in an inline cartridge carrier are affected by numerous conditions that can be manually controlled, other conditions, which are due to the unpredictability of fluid flow, for example, changes in fluid flow in the dispensing system can occur due to eddies, vortices as well as laminar, turbulent or slug flow, which can affect the dispersant rate from an inline dispenser. These fluid flow changes in and around the cartridges may affect the dispersant rate from an inline cartridge based on axial placement of the inline cartridges within an inline cartridge carrier 13. Unfortunately, it is difficult to control or understand the changes in dispersant rates if inline cartridges are periodically inserted or replaced in an inline cartridge carrier without regard for axial position of the cartridges with respect to one another within the inline cartridge carrier.

The invention eliminates known or unknown problems that a hot tub owner or the like that may or may not occur due to a change in axial position or sequence of inline dispenser cartridges within an inline skeleton housing. The invention includes unique keys i.e., protrusions on the cartridges and unique mating keyways i.e., slots on the skeleton housings that prevents changing the axial inline dispensing position of cartridges within the cartridge carrier. The invention can also prevent insertion of improper cartridges into an inline dispenser housing as well as maintaining inline axial position of cartridges therein when new or replacement cartridges are inserted into a cartridge carrier. Consequently, dispensing system 70 as shown in FIG. 2 can eliminate known or unknown problems due to dispensing rate changes that arise because of changes in the axial placement of inline cartridges. Although, in some cases the axial position of two or more inline dispenser cartridges may not influence the amount of dispersant delivered to a body of water in other cases the axial position of two or more inline cartridges may influence the amount of dispersant delivered to the body of water. The present invention avoids problems that may occur through changes in position of inline cartridges. In one embodiment, the invention includes a mating key and keyway on the cartridges and the cartridge carrier to minimize or eliminate unknown or known problems created by fluid flow changes due to changing the axial position of cartridges within a cartridge carrier.

Figure 3:
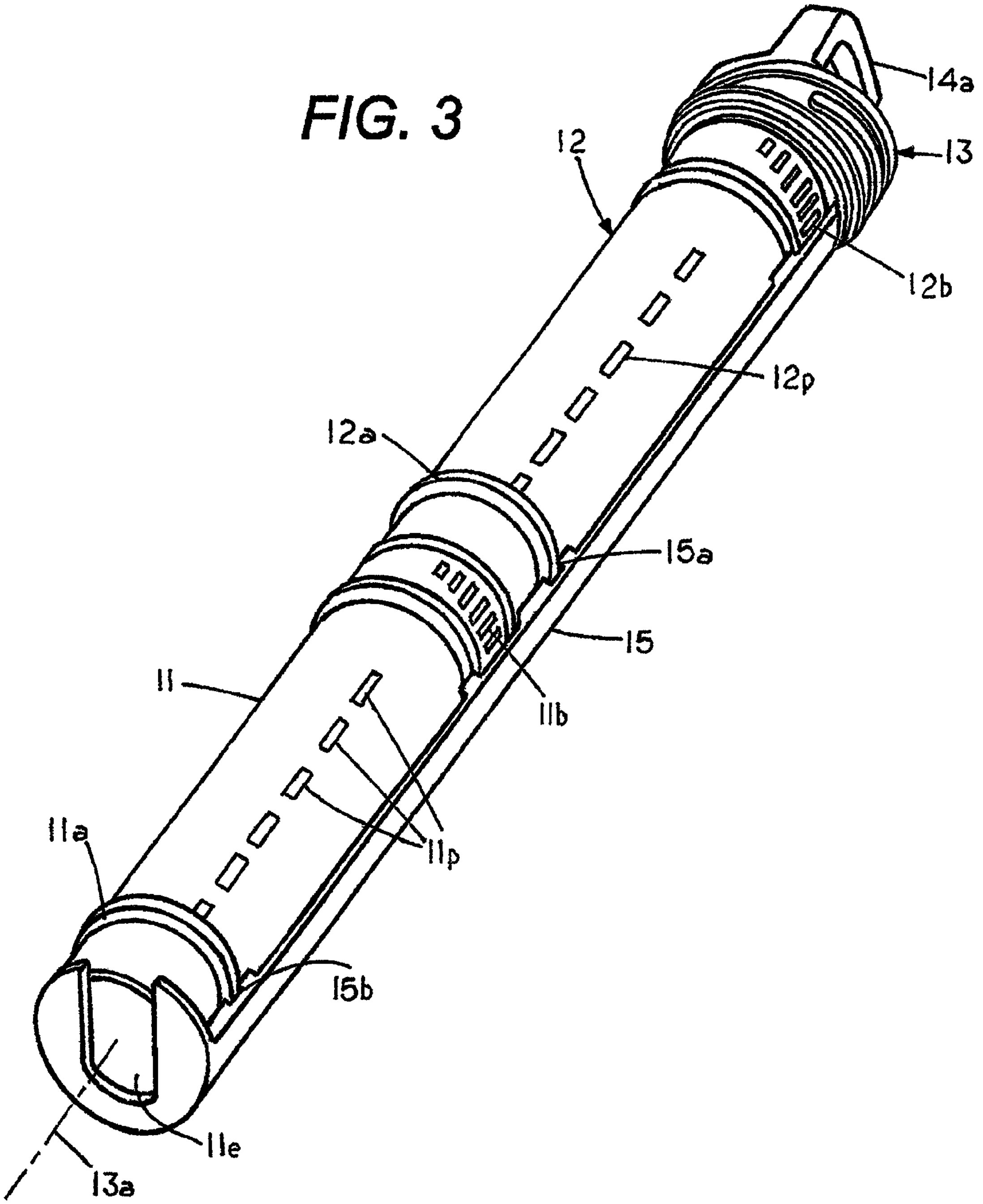
FIG. 3 is an assembled view of the cartridge carrier and the mating cartridges of FIG. 1.

In one example, cartridge carrier 13 includes an open handle with a finger loop 14*b* for inserting or removing cartridge carrier 13 from a hot tub well or the like. The handle 14*b* is shown as a loop where one can insert his or her hand therein. However, the handle can take other shapes that one can grasp to insert or remove the skeleton housing 15 of cartridge carrier 13 from a well in the hot tub. For example, the handle may be a cap on the skeleton housing having a diametrical extending cartridge carrier hand grip 14*a* as shown in FIG. 3. Alternately an axial extension of the skeleton housing that one can grasp can be used to insert or remove the skeleton housing and the cartridges therein from a well in a hot tub.

FIG. 2 shows an exploded view of a dispenser kit 70 comprising a cartridge carrier 13 that includes a first partial cylindrical compartment 21 that can uniquely cradle and fixedly hold a first cartridge 11 therein and a second partial cylindrical compartment 20 that can uniquely cradle and fixedly hold a second cartridge 12 therein with the compartments 20 and 21 located in an end-to-end position. FIG. 3 shows cartridge 11 and cartridge 12 located in cartridge carrier 13. Cartridge 11 includes a set of elongated diffusion ports 11*p* for dispensing a dispersant therein into the body of water around cartridge 11. Similarly, cartridge 12 includes a set of elongated diffusion ports 12*p* for dispensing a dispersant therein into the body of water around cartridge 12.

A feature of the invention shown in FIG. 2 is that cartridge 11 includes an integral key 11*a* spaced a distance $x_1$ from the end 11*e* of cartridge 11 and cartridge 12 includes a key 12*a* spaced a distance $x_2$ from the end 12*e* of cartridge 12. Key 11*a* is a protruding annular ridge or boss, which is located on the peripheral surface of cartridge 11. In this example, key 11*a* protrudes radially outward from cartridge 11 to prevent cartridge 11 from being inserted into a cradled condition in compartment 20 where there is no keyway i.e., no mating recess for key 11*a* in compartment 20, which is at a distance $x_1$ from the end of dividers 16*a* and 16*b* of cartridge carrier 13.

Key 11*a* can form mating engagement with compartment 21 since one can insert cartridge key 11*a*, which in this example is a boss or annular ridge, into compartment 21 since key 11*a* mates with keyway 15*b*, which in this example comprise a semi-annular slot located at an end distance $x_1$ from cartridge end stop 18*b*. FIG. 2A is an isolated view of the end of the cartridge housing 15 showing that keyway 15*b* is located a distance $x_1$ from cartridge end stop 18*b*, which is the same distance key 11*a* is located from cartridge end 11*e* thus allowing cartridge 11 to be cradled and supported in compartment 21 of cartridge carrier 13.

Similarly, cartridge 12 includes an integral key 12*a* spaced a distance $x_2$ from the end 12*e* of cartridge 12. Key 12*a* can be a protruding annular ridge or boss, on the peripheral surface of cartridge 12. In this example, key 12*a* protrudes radially outward from cartridge 12 to prevent cartridge 12 from being inserted into a cradled condition in end compartment 21 if there is no keyway i.e., mating recess for key 12*a* in end compartment 20. In this example the distance of key 12*a* from the end 12*e* of cartridge 12 is designated as $x_2$, which is the same distance of keyway 15*a* from dividers 16*a* and 16*b*. Thus, key 12*a* can form mating engagement with compartment 20 since one can insert cartridge key 12*a*, which is a boss or annular ridge, into compartment 20 a key 12*a* mates with keyway 15*a*, which in this example comprise a semi-annular slot that can cradle cartridge 12 therein. However, since the end distances $x_1$ of rib 11*a* of cartridge 11 and end distance $x_2$ of rib 12*a* cartridge 12 are different, one cannot interchange positions of cartridge 11 or cartridge 12 since cartridge 11 could not be cradled in compartment 20 for lack of a mating keyway therein and cartridge 12 could not be cradled in compartment 21 for lack of a mating keyway therein.

Figure 3A:
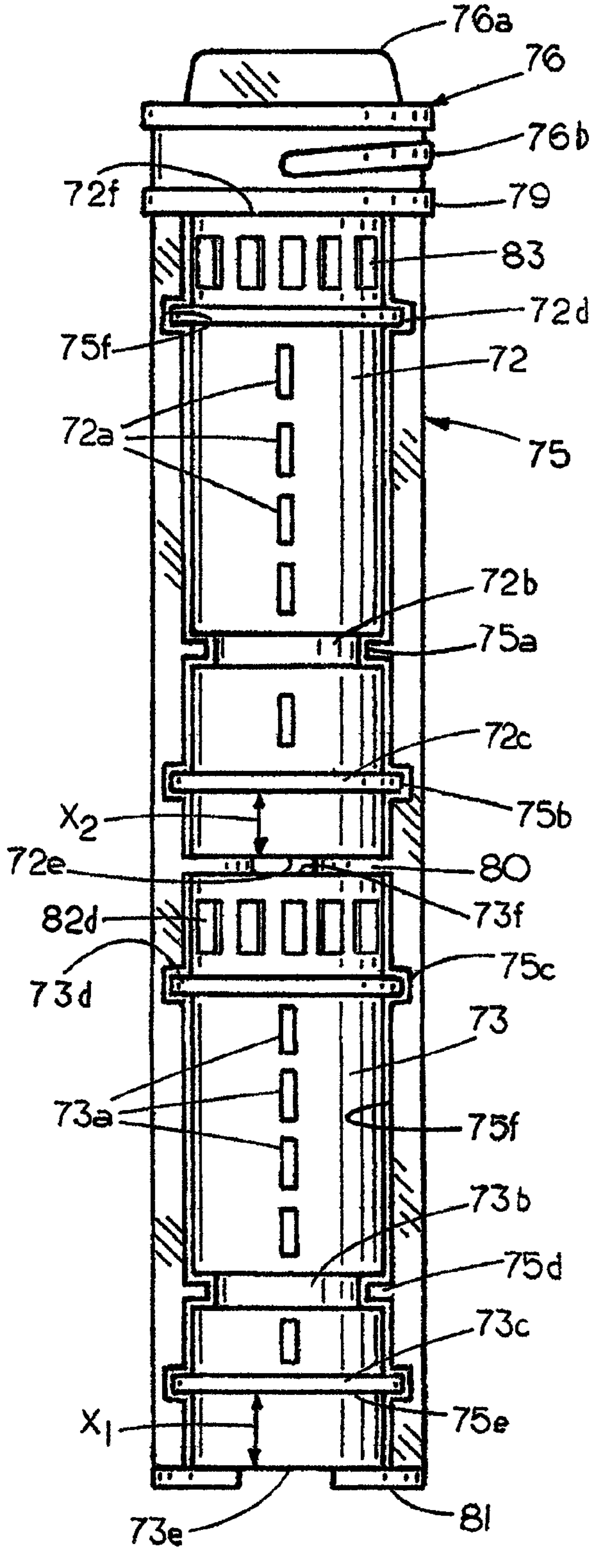
FIG. 3A is an assembled view of the cartridge carrier and the mating cartridges where the cartridge carrier contains both a key and a keyway for mating cartridges.
Figure 3B:
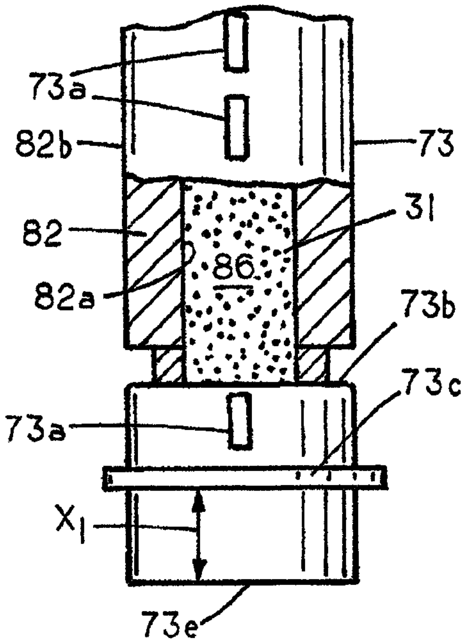
FIG. 3B is a cutaway view of a cartridge carrier of one of the dispensers of FIG. 3A.

The example of FIG. 3A and FIG. 3B show cartridge dispensers for delivery of a dispersant into a body of recreational water. That is, cartridge dispenser 73 includes an elongated cylindrical housing with a sidewall 82 on the elongated housing having an internal surface 82*a* and an external surface 82*b* having a top end 72*f* and a bottom end 73*e* each joined with the sidewall 82 to form a compartment 86 therein for carrying a dispensing material 31 i.e., dispersant therein. Located in the sidewall 82 are a set of ports 73*a* for water ingress and egress to compartment 86. Cartridge 73 includes a mateable feature, which in this embodiment comprise an annular rib 73*c*, on sidewall 82 with the mateable feature extending radially outward from an external surface 82*b* for cradle engagement. A further mateable feature 75*e* (an annular recess) within the skeleton housing 75 is mateable with an annular ring 73*c*, which extends radially outward from cartridge dispenser 73. That is, mateable features 73*c* and 75*e* are complementary mateable features for engaging each other in a clearance fit to permit lateral insertion of cartridge dispenser 73 into the cradling position shown in FIG. 3A to maintain an axial position of the cartridge dispenser 73 within the cartridge carrier 75 if the cartridges are removed for replacement of either of the cartridges.

As shown in FIG. 3 and FIG. 3B the mateable feature 73*b* on cartridge dispenser sidewall 82 extends radially inward from an external surface 82*b* for cradle engagement within the cartridge carrier elongated housing 75. The elongated housing 75 contains a second complementary mateable feature 75*a* that extends radially inward from surface 75*f* for engaging with mateable feature 72*b* to maintain an axial position of the cartridge dispenser 73 within cartridge carrier 75. Typically, only one set of mateable features are needed on the cartridge carrier 75 and the cartridge dispenser 73 although two or more sets of mateable features may be used as illustrated in FIG. 3A.

The mating and cradling features described herein ensures that when cartridges are replaced in cartridge carrier 13 the axial location of cartridges 11 and 12 with respect to each other remain the same since there is only one axial orientation for the cartridges in housing cartridge carrier 75 thus eliminating differences in cartridges dispersant rates, which may be a function of changing the axial position of the cartridges within cartridge carrier 75.

With the present invention one can laterally insert cartridge 11 into a first cradling condition in compartment 21 of skeleton housing 15 but not in compartment 20 of skeleton housing 15. In this example the resiliency of the semi-circular skeleton housing 15, which extends slightly over 180 degrees, flexes to allow housing semi-circular side walls 15 to flex radially outward to permit the first cartridge 11, with a first key 11*a*, which is a distance $x_1$ from the end of cartridge 11, to be laterally inserted into the first keyway15*b* as shown in FIG. 3. Similarly, one can laterally insert cartridge 12 into a cradling condition in cartridge carrier 15 where the resiliency of the skeleton housing semicircular side wall which extends over 180 degrees, flexes to allow the second cartridge 12, with the second key 12*a*, which is a distance $x_2$ from the end of cartridge 12, to be laterally inserted into the second keyway 75*b* as shown in FIG. 3A thereby bringing the cartridge 11 and cartridge 12 into an end-to-end condition within skeleton housing 15.

In the example shown in FIG. 3, key 11*a* comprises a boss located on cartridge 11 and key 12*a* comprises a boss located on cartridge 12 with the keyway 15*b* having an arcuate shape mateable with boss 11*a* and keyway 15*a* having an arcuate shape mateable with boss 12*a*. While arcuate shaped keys and arcuate shaped keyways are shown, other shapes of mateable keys and keyways may be used without departing from the spirit and scope of the invention. While two dispensers are shown each with a key or keyway to mate in a dispensing position of the skeleton housing 15, however; note that with the present invention, it is sufficient to maintain axial position of only one of the cartridges during insertion or removal of cartridges. That is, if only one of the cartridges contains a key or keyway that snugly fits in only one axial position of one of the compartments in the skeleton housing and the other cartridge could fit in either compartment, there would still be only one axial position where both cartridges could be snugly or cradleably held in the skeleton housing 15.

FIG. 2 shows that the key 11*a* and key 12*a* on cartridges 11 or 12 may be identical. In such a case the axial position "$x_1$" of the first key on the first cartridge and the axial position "$x_2$" of the second key can be different from each other so the axial position of the keys determines the axial position of the cartridges in the cartridge carrier. In addition, a different shape of the keys on each dispenser can be used to prevent the first cartridge from being inserted in the cartridge carrier position for the second cartridge or the second cartridge from being inserted in the cartridge carrier position for the first cartridge while still allowing the cartridge 11 and cartridge 12 to be inserted into the proper location in cartridge carrier 13. In this example, one brings the first cartridge 11 into an end-to-end cradling position with cartridge 12 as shown in FIG. 3.

FIG. 3 shows cartridge carrier 13 supporting and cradling the dispensing cartridge 11 and the cartridge 12 in an end-to-end dispensing condition within skeleton housing 15.

Skeleton housing 15 with dispensing cartridges 11 and 12 therein is typically placed in chamber 19*a* in housing 19, which is shown in FIG. 1.

In this example the inline cartridge carrier 13 shown in FIG. 2 and FIG. 3 includes an open handle 14*a* and an open body skeleton housing 15 having a set of spaced openings 13*b* therein that allows ingress and egress of water through the skeleton housing and into and out of cartridges held therein while at the same time providing a convenient tool for simultaneously inserting cartridges 11 and 12 and the skeleton housing 15 into a dispensing condition in a dispensing chamber or for simultaneously removing the cartridges and the skeleton housing 15 from a dispensing chamber such as well 19*a*.

While cartridge carrier 13 can be typically used in spas, hot tubs or the like no limitation thereto is intended. Skeleton housing 15, which comprises a resilient material, has a first elongated edge 15*c* and a second elongated edge 15*d* that extends over halfway around the cylindrical cartridges 11 and 12 to hold the cartridges therein. In this example the resilient skeleton housing 15 provides a snap-in engagement of the cylindrical cartridges. That is, one can laterally and forcibly insert the cartridges between elongated edge 15*c* and elongated edge 15*d* which causes edge 15*c* and edge 15*d* to first spread apart and then come together when the cylindrical shaped cartridges are within the cylindrical shaped skeleton housing 15.

A feature of the invention is that the cartridge carrier 13 and the cartridge 11 and cartridge 12 used therein each have an external boss that engages with a cradle shape keyway and cradle shaped compartment in the skeleton housing 15. That is, cartridge 11 is axially cradleable in a first portion of the skeleton housing 15 with the first cartridge 11 having a boss 11*a* for axial positional engagement of the first cartridge 11 in a first keyway slot or cradle 15*b* in a first portion in skeleton housing 15. Similarly, the second cartridge 12 is axially cradleable in a second portion of the skeleton housing 15 with the second cartridge 12 having a boss 12*a* for axial positional engagement of the second cartridge 12 in a second keyway slot or cradle 15*a* in the second portion in skeleton housing 15.

FIG. 2 and FIG. 3 show the compartment 21 in an end portion of skeleton housing 15 supporting cartridge 11 and the compartment 20 in skeleton housing 15 supporting cartridge 12 with compartment 20 and compartment 21 axially offset from each other. The keyway 15*a*, prevents insertion of the cartridge key 11*a* into keyway 15*a*. Similarly, the keyway 15*b*, prevents insertion of the cartridge key 12*a* into the keyway 15*b*.

In the above example, the skeleton housing 15 contains two keyways 15*a* and 15*b* and the cartridges contained two keys for mating insertion therein. In an alternate embodiment one places the keys in the skeleton housings and the keyways in the cartridges, which prevents a cartridge with no keyway slots from being inserted into the cartridge support housing.

FIG. 3A is an assembled view of an embodiment of a cartridge carrier 76 with a first mating cartridge 72 located in a top compartment of the skeleton housing 75 and a second mating cartridge 73 located in a bottom compartment of the skeleton housing 75. In this example, cartridge carrier 76 includes a top end with a cap 79 with a handle 76*a* comprising a diametrical rib 76*a*, which one can grasp and rotate cartridge carrier 76 to bring thread 76*b* into engagement with mating threads in the well of a hot tub to support cartridge carrier 76 therein.

Cartridge 72 contains three locaters namely an annular key 72*c*, an annular key 72*d* and an annular keyway 72*b*. Extending lengthwise along cartridge 72 is a set of dispensing ports 72*a* to permit ingress and egress of water into the contents of the cartridge 72. Cartridge 72 is peripherally secured in a top compartment of cartridge carrier 76 by cartridge carrier skeleton housing 75 and axially secured by a divider 80 and cap 79. In this example, the keys on cartridge 72 permit cartridge 72 to be inserted in a top compartment of cartridge carrier 76 but not a bottom compartment of cartridge carrier 76.

Cartridge 73 is similar to cartridge 72, however, cartridge 73 contains a different set of keys, namely an annular key 73*d*, an annular key 73*c* and an annular keyway 73*b*. In this example, the keys on cartridge 73 permit cartridge 73 to be inserted into a bottom compartment of cartridge carrier 76 but not the top compartment of cartridge carrier 76.

Cartridge 72 contains a cap with a hand grip 83, a set of ports 72*a* for the ingress and egress of water into the contents of cartridge 72. Similarly, cartridge 73 contains a cap with a hand grip 82*d*, a set of ports 73*a* for the ingress and egress of water into the contents of cartridge 73. In this example, the contents of cartridge 72 may be chlorine and the contents of cartridge 73 may be minerals although other contents may be paired in the cartridges carried in cartridge carrier 76.

FIG. 3A shows cartridge 72 fitted into a top compartment formed between cap 79 and a divider 80 in cartridge carrier skeleton housing 75 through the engagement of cartridge key 72*d* and cartridge carrier keyway 75*f*, the engagement of cartridge key 72*c* and cartridge carrier keyway 75*b* and the engagement of cartridge carrier key 75*a*, which in this example comprises a radial protrusion such as a semi-annular ring and cartridge keyway 72*b*.

FIG. 3A shows cartridge 73 fitted into a bottom compartment formed by divider 80 and end cap 81 in skeleton housing 75 through the engagement of cartridge key 73*d* and cartridge carrier keyway 75*c*, the engagement of cartridge key 73*c* and cartridge carrier keyway 75*e* and the engagement of cartridge carrier key 75*d* and cartridge keyway 73*b*.

In cartridge 72 the axial distance from the bottom of cartridge 72 to the annular key 72*c* is denoted by $x_2$ and in cartridge 73 the axial distance from the bottom 73*e* of cartridge 73 to the annular key 73*c* is denoted by $x_1$ where $x_1$ and $x_2$ are different from each other to prevent interchanging the axial position of the cartridges 72 and cartridge 73 in cartridge carrier 76. In addition, the keys 75*a* and 75*d* prevent insertion of cartridges that lack a mating keyway, which can prevent someone from accidentally placing cartridges with unsuitable dispensing agents into the cartridge carrier 76, where the unsuitable dispensing agent may adversely affect the safety or the comfort of the body of recreational water in a hot tub or the like.

FIG. 3B shows a sectional view of one end of cartridge dispenser 73, which comprises an elongated housing with a circumferential sidewall 82 having an external surface 82*b* and an internal surface 82*a* forming an internal chamber 86 for carrying a dispersant 31 therein. Sidewall 82 includes a set of ports 73*a* for ingress and egress of water into the dispersant in internal chamber 86.

FIG. 3B shows cartridge dispenser 73 includes a keyway 73*b*, which is located on the external surface of the sidewall 82, with the keyway 73*b* extending partially inward from the external surface 82*b* to form an arcuate recess 73*b* in sidewall 82 for receiving an annular key or radial protrusion of cartridge carrier 76 when the cartridge dispenser 73 is placed in a cradled position (FIG. 3A) in cartridge carrier 76.

Figure 4:
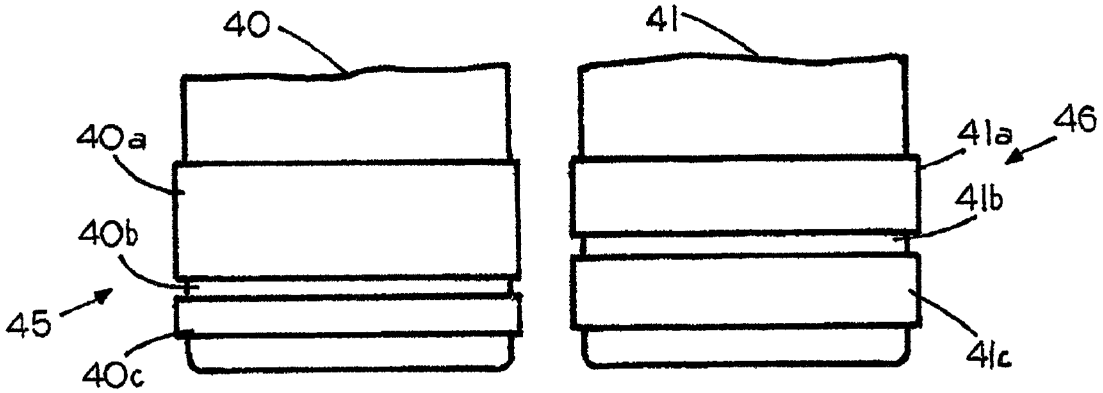
FIG. 4 is a partial view of an end portion of a set of two different mateable cartridges.

FIG. 4 shows an example of a side-by-side view of an end portion of a first cartridge 40 and a second cartridge 41 with each having different size keys and keyways thereon. Cartridge 40 contains a first key comprising a first wide boss 40*a* (an arcuate rib), and a second narrow boss 40*c* (an arcuate rib) axially separated from each other by an annular space 40*b*. In this example key 45 forms mating engagement through a clearance fit between a portion of a skeleton housing having a complimentary shaped arcuate recess and a complimentary shaped arcuate rib to allow a unique placement of cartridge 40 in a skeleton housing such as skeleton housing 75. Similarly, the end portion of a second cartridge 41 contains a key 46 comprising a first key 41*a* (an arcuate rib), and a second key comprising a second key 41*c* (an arcuate rib) separated from each other by an annular space 41*b*.

In this example a cartridge carrier skeleton housing may be used to support both cartridge 40 and cartridge 41 in a dispensing condition with both cartridge 40 and cartridge 41 keyed into the same skeleton housing through a clearance fit between the key and the keyways.

Figure 5:
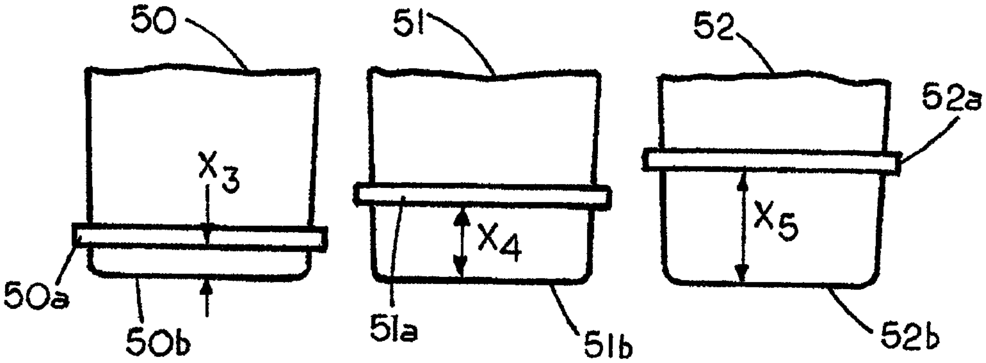
FIG. 5 is a partial view of an end portion of a set of three different mateable cartridges each having an annular ridge.

FIG. 5 is a side-by-side view of an end portion of a set of three different mateable cartridges 50, 51 and 52, each having an annular ridge or boss of identical size with the axial spacing of the ribs forming a key unique to each of the cartridges. In this example boss 50*a* on cartridge 50 forms a first key comprising an annular rib, which is located a distance $x_3$ from cartridge end 50*b*. Similarly, boss 51*a* on cartridge 51 forms a second key comprising an annular rib, which is located a distance $x_4$ from cartridge end 51*b*. Cartridge 52 also has an annular rib 52*a* located an end distance $x_5$ from cartridges end 52*b*, which is greater than the first end distance $x_3$ for cartridge 50 or the end distance $x_4$ for cartridge 51. In this example, the keys are of the same size and shape but the spacing of the keys from the end of the cartridges determines if the cartridge can fit into a cartridge carrier. Thus, in this example the axial spacing of the keys from the end of the respective cartridges represents a family of three cartridges each with the same key for mating with a skeleton housing where the axial positions of the cartridges determine if the cartridge can be inserted into a cartridge carrier.

Figure 6:
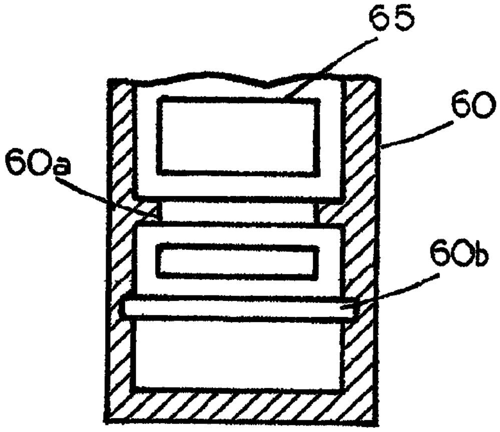
FIG. 6 is a sectional view of a mateable region of a skeleton housing that includes an arcuate recess and an arcuate rib.

FIG. 6 is a sectional view of another example of a dispenser mateable region on an end of a skeleton housing 60. In this example skeleton housing 60 has an opening 65 and includes a key comprising an annular ring 60*a* and a keyway comprising an annular recess 60*b*.

A feature of the invention described herein is that it not only does the cartridge carrier with a key or keyway, enable one to properly position cartridge dispensers such as cartridge dispenser 11 and cartridge dispenser 12 within a cartridge carrier 13 it also enables a hot tub manufacturer to assist a hot tub user to insert a cartridge dispenser that contains the correct dispersants, which are recommend by the hot tub manufacturer, into the inline well of the hot tub user.

In one example the method includes maintaining compatible between a dispersant contained in a cartridge dispenser and a dispersant recommendation of a hot tub manufacturer by associating a hot tub manufacturer with a key and a keyway where the key and the keyway are unique to the hot tub manufacturer and the key and keyway are mateable with each other. In this example, one can also make cartridge carrier 13, with a key or keyway unique to the hot tub manufacturer. By placing the dispersant recommendation of the hot tub manufacturer in a cartridge dispenser having the key or keyway unique to the hot tub manufacturer enables the hot tub manufacturer to assist the hot tub owner in properly maintaining the water in the hot tub. That is, one can place the cartridge dispenser that contains the recommend dispersants in the cartridge carrier by mateingly engaging the key or keyway on the cartridge dispenser with the key or keyway in the cartridge carrier with assurance the recommended water treatment dispersants have been added to the hot tub. On the other hand, if the cartridge dispenser does not mate with the cartridge carrier there is no assurance that the proper water treatment methods are contained in the cartridge dispensers.

We claim:

1. An inline dispenser system comprising:

a skeleton housing comprising a first portion, a second portion, a central axis, and a set of openings therein for ingress or egress of water;

a handle on the skeleton housing for insertion or removal of the skeleton housing from a water treatment well in a hot tub;

a first cartridge axially cradleable in the first portion of the skeleton housing, the first cartridge comprising an annular ridge for axial positional engagement of the first cartridge in the first portion of the skeleton housing but not in the second portion of the skeleton housing, wherein the first portion of the skeleton housing comprises an annular recess mateable with the annular ridge on the first cartridge; and a second cartridge cradleable in the second portion of the skeleton housing, the second cartridge comprising an annular ridge for axial positional engagement of the second cartridge in the second portion of the skeleton housing but not in the first portion of the skeleton housing, wherein the second portion of the skeleton housing comprises an annular recess mateable with the annular ridge on the second cartridge, wherein the annular ridge on the first cartridge is located a first distance from an end of the first cartridge, and the annular ridge on the second cartridge is located a second distance from an end of the second cartridge, the first distance and the second distance being different from each other.

2. The inline dispenser system of claim 1 wherein the first portion of the skeleton housing contains a protrusion to prevent engagement of the first cartridge without a corresponding recess for mating engagement with the protrusion.

3. The inline dispenser system of claim 1 wherein the second portion of the skeleton housing contains a radial protrusion to prevent engagement of the second cartridge without a corresponding mating recess therein.

4. The inline dispenser system of claim 1 wherein the skeleton housing contains an arcuate rib to prevent engagement with the first cartridge or the second cartridge lacking a corresponding arcuate recess.

5. The inline dispenser system of claim 1 further comprising at least two protruding keys and at least two keyways on each of the first cartridge, the second cartridge, and the skeleton housing.

6. The inline dispenser system of claim 1 wherein the first cartridge contains a first set of mateable features, and the skeleton housing contains a second set of mateable features, wherein the first set of mateable features is mateable with the second set of mateable features.

7. The inline dispenser system of claim 1 wherein an axial position of the annular ridge on the first cartridge and a different axial position of the annular recess on the skeleton housing prevents mateable engagement of the first cartridge and the skeleton housing.

8. The inline dispenser system of claim 1 further comprising an open handle with a finger loop located on a cap of the skeleton housing, the open handle useable for inserting or removing the skeleton housing from the water treatment well in the hot tub.

9. The inline dispenser system of claim 1 wherein the second portion of the skeleton housing is axially offset from the first portion of the skeleton housing.

10. The inline dispenser system of claim 1 wherein the first cartridge and the second cartridge are flexuraly restrained by a resilient skeleton housing sidewall extending over 180 degrees around the first cartridge and the second cartridge.

11. An inline dispenser system comprising:

a skeleton housing, the skeleton housing having a partial circumferential side wall for maintaining at least two cartridges in an end-to-end dispensing condition as water flows along the skeleton housing, the partial circumferential side wall having openings therein for ingress and egress of the water into and out of the at least two cartridges that are cradleable in the skeleton housing, wherein a first cartridge of the at least two cartridges is insertable and cradleable in either a first cradle position or a second cradle position within the skeleton housing, the first cartridge comprising a first key or keyway, wherein either a second cartridge or the skeleton housing comprises a second key thereon to prevent insertion of the second cartridge into the first cradle position in the skeleton housing but not into the second cradle position in the skeleton housing to maintain an inline dispensing orientation of the first cartridge with respect to the second cartridge when the at least two cartridges are held in the skeleton housing, and wherein the first key or keyway on the first cartridge is located a first distance from an end of the first cartridge, and the second key is located a second distance from either an end of the second cartridge or an end of the first cradle position, the first distance and the second distance being different from each other.

12. The inline dispenser system of claim 1 wherein the annular recess in the first portion of the skeleton housing is located a first distance from a cartridge end stop in the skeleton housing, and the annular recess in the second portion of the skeleton housing is located a second distance from a divider, the first distance and the second distance being different from each other, and wherein the divider separates the first portion of the skeleton housing from the second portion of the skeleton housing.

* * * * *